United States Patent
Uchimura et al.

(10) Patent No.: US 8,608,382 B2
(45) Date of Patent: Dec. 17, 2013

(54) STATIC-PRESSURE BEARING APPARATUS AND STAGE COMPRISING STATIC-PRESSURE BEARING APPARATUS

(75) Inventors: Shoji Uchimura, Toyokawa (JP); Mamoru Ito, Toyokawa (JP)

(73) Assignee: Sintokogio Ltd., Aichi (JP)

( * ) Notice: Subject to any disclaimer, the term of this patent is extended or adjusted under 35 U.S.C. 154(b) by 0 days.

(21) Appl. No.: 13/574,462

(22) PCT Filed: Sep. 13, 2010

(86) PCT No.: PCT/JP2010/065709
§ 371 (c)(1),
(2), (4) Date: Jul. 20, 2012

(87) PCT Pub. No.: WO2011/089752
PCT Pub. Date: Jul. 28, 2011

(65) Prior Publication Data
US 2012/0301060 A1    Nov. 29, 2012

(30) Foreign Application Priority Data

Jan. 22, 2010    (JP) .................................. 2010-011528

(51) Int. Cl.
*F16C 29/02*    (2006.01)
*F16C 32/06*    (2006.01)
(52) U.S. Cl.
CPC .................................. *F16C 32/0614* (2013.01)
USPC ..................... 384/12; 384/7; 384/26; 384/109
(58) Field of Classification Search
USPC ............... 384/12, 26, 42, 100, 109, 274, 276, 384/279, 308, 907.1, 132
See application file for complete search history.

(56) References Cited

U.S. PATENT DOCUMENTS 4,226,483 A * 10/1980 Yamamoto ...................... 384/12
4,606,587 A *  8/1986 Thompson ...................... 384/12
(Continued)

FOREIGN PATENT DOCUMENTS

EP    1424501 A2 *  6/2004  ............. F16C 32/06
JP    03213718 A *  9/1991  ............. F16C 32/06
(Continued)

OTHER PUBLICATIONS

Chinese Patent Office, "Office Action," Jan. 18, 2013, issued in corresponding Chinese application 201010293517.6, 3 pages.

(Continued)

*Primary Examiner* — Marcus Charles
(74) *Attorney, Agent, or Firm* — Finnegan, Henderson, Farabow, Garrett & Dunner, L.L.P.

(57) ABSTRACT

A static-pressure bearing apparatus that prevents vibrations, the apparatus including an orifice and a vent groove, such that a laminar-flow status may be maintained in the entire region of the routes of the ventilated pressurized gas. A stage equipped with the static-pressure bearing apparatus is also provided. The configurations, such as the shapes of the orifice 14, vent groove 11, and the exhaust groove 12, of the static-pressure bearing apparatus 1, are designed such that a laminar flow may be maintained in the entire region of the routes for ventilation of the pressurized gas. The vent groove 11 comprises the circular groove 11b and a plurality of distributing grooves 11a. The vent groove 11 is formed to be symmetrical about the centerline of the direction that the moving body 10 moves. The circular groove 11b is formed as a circle to surround the orifice 14. The plurality of distributing grooves 11a extend radially from the orifice 14 to the circular groove 11b such that the plurality of distributing grooves 11a connect the circular groove 11b and the orifice 14.

6 Claims, 8 Drawing Sheets the direction of the movement

(56) References Cited

U.S. PATENT DOCUMENTS

| | | | |
|---|---|---|---|
| 4,741,629 A * | 5/1988 | Hooykaas | 384/121 |
| 4,838,710 A * | 6/1989 | Ohta et al. | 384/107 |
| 6,164,827 A * | 12/2000 | Eitzenberger | 384/12 |
| 6,471,404 B1 * | 10/2002 | Gozdawa | 384/100 |
| 6,951,025 B2 * | 9/2005 | Oe | 720/695 |
| 7,052,182 B2 * | 5/2006 | Shinohara et al. | 384/12 |
| 7,196,028 B2 * | 3/2007 | Ujita et al. | 501/127 |
| 2004/0114839 A1 | 6/2004 | Mukai et al. | |

FOREIGN PATENT DOCUMENTS

| | | | |
|---|---|---|---|
| JP | 05-010330 | 1/1993 | |
| JP | 06-193635 | 7/1994 | |
| JP | 06280876 A * | 10/1994 | F16C 32/06 |
| JP | 06-307449 | 11/1994 | |
| JP | 06341429 A * | 12/1994 | F16C 17/03 |
| JP | 10103354 A * | 4/1998 | F16C 32/06 |
| JP | 200104142 A * | 2/2001 | |
| JP | 3260869 | 12/2001 | |
| JP | 2002039180 A * | 2/2002 | F16C 32/06 |
| JP | 2002-188632 | 7/2002 | |
| JP | 2003-194059 | 7/2003 | |
| JP | 2004-169784 | 6/2004 | |
| JP | 2005032818 A * | 2/2005 | H01L 21/68 |
| JP | 2006-29412 | 2/2006 | |
| JP | 2007078126 A * | 3/2007 | |
| JP | 2010151322 A * | 7/2010 | |

OTHER PUBLICATIONS

Japanese Patent Office, "International Search Report," from International application No. PCT/JP2010/065709, Dec. 14, 2010, 1 page.
Koren Patent Office, "Office Action," Jan. 28, 2013, issued in corresponding Korean application 2012-7007329, 4 pages.

* cited by examiner (A)

(B)

(A)

the direction of the movement

PRIOR ART (B)

PRIOR ART

STATIC-PRESSURE BEARING APPARATUS AND STAGE COMPRISING STATIC-PRESSURE BEARING APPARATUS

TECHNICAL FIELD

The present invention relates to a highly accurate static-pressure bearing apparatus and a stage comprising it. The static-pressure bearing apparatus may float, support, and move a moving body in relation to a fixed body, by using pressurized gas.

BACKGROUND OF THE INVENTION

A static-pressure bearing apparatus has been conventionally used as an apparatus such as an apparatus for processing, an apparatus for inspection, and an apparatus for manufacturing a semiconductor, all of which require highly accurate positioning. An example of a conventional static-pressure bearing apparatus is shown in FIG. 9. As shown in FIG. 9 (A), the static-pressure bearing apparatus 100 consists of the fixed body 120 and the moving body 110. The fixed body 120 is formed as a rectangle. The moving body 110 is formed to surround the fixed body 120. Also, the moving body 110 is configured to be movable along the fixed body 120. An enlarged illustration of the cross-section X-X of FIG. 9 (A) is shown in FIG. 9 (B). The static-pressure pad 111 is formed on the sliding surface 110a of the moving body 110. The static-pressure pad 111 comprises the outlet 111a and the vent groove 111b. The outlet 111a communicates with a source of pressurized gas and discharges the pressurized gas. The vent groove 111b distributes the pressurized gas, which is discharged from the outlet 111a, along the sliding surface 110a. For example, the vent groove 111b is formed to have a rectangular cross-section. The groove is about 30 microns deep and 1,000 microns wide.

The static-pressure bearing apparatus 100 may float the moving body 110 above the fixed body 120 by discharging pressurized gas from the static-pressure pad 111 into the bearing clearance G1 that is formed between the sliding surface 110a of the moving body 110 and the fixed body 120. Also, the static-pressure bearing apparatus 100 may move the moving body 110 along the direction that the fixed body 120 is extended. In this way, the static-pressure bearing apparatus 100 may very accurately position the moving body 110, because the apparatus has a mechanism that moves the moving body 110 without it contacting the fixed body 120, such that vibrations hardly occur in the apparatus.

Recently, a more accurate positioning, for example, in the order of 10 nm or less, is required, when an ultrahigh-accurate process or an ultrahigh-accurate measurement is performed by using a static-pressure bearing apparatus. So, minor vibrations of a moving body have come to be a problem, though such minor vibrations were not regarded as being a problem previously.

Vibrations of a moving body occur due to unstable pressurized gas flowing through the bearing clearance G1. The flow of pressurized gas is stable in a laminar region and a turbulent region. In contrast, the pressure of pressurized gas fluctuates and the flow of pressurized gas is unstable in an intermediate region. The transient region between a laminar region and a turbulent region has a Reynolds number Re of 2,000 to 3,000. So, the transient region may be changed into a laminar status, if the Reynolds number of the transient region is changed to be not more than 2,000. Vibrations do not occur in the laminar state, because the pressurized gas flows smoothly.

To suppress vibrations of a moving body in a static-pressure bearing apparatus, for example, Patent document 1 discloses a method for improving patterns and shapes of passages in a vent groove to provide a passage configured to suppress the occurrence of turbulent flows. Patent document 2 discloses a method for reducing the viscous resistance of the flow of gas and preventing the occurrence of a turbulent flow, by reducing the surface roughness of a sliding surface of a static-pressure pad. Patent document 3 discloses a method for preventing vibrations by roughening gas outlets of a sliding surface of a static-pressure pad to eliminate the transition region between a turbulent flow and a laminar flow and for generating a stable turbulent region instead of the transition region. The approach in Patent document 3 is opposite to the approach in Patent documents 1 and 2.

Patent document 1: JP2003-194059
Patent document 2: JP6-307449
Patent document 3: JP3260869

SUMMARY OF THE INVENTION

However, when a rectangular vent groove and a passage pattern having a corner were used like the method of Patent document 1, there was a problem in that vibrations occurred. This is because the flow of pressurized air was easily disturbed in a corner etc., because of a change of a bearing clearance, especially because a turbulent flow easily occurs when the flow rate of pressurized gas is increased to improve the stiffness of the static-pressure apparatus. Also, there was a problem in that the cost for manufacturing the apparatus increased, if a sliding surface of a static-pressure pad was made to have a very smooth surface having a surface roughness Ra of 0.1 micron or less, as in the method of Patent document 2. Further, an intermediate flow can occur between a laminar flow and a turbulent flow, even if a turbulent flow is intentionally generated by roughening the surface of the sliding surface as disclosed in Patent document 3, because a bearing clearance between a moving body and a fixed body can easily vary while the moving body is being moved. Also, micro vibrations generated by a turbulent flow do not have a specific frequency, but have broad frequencies of 10 to several 10s kHz. So, a resonant frequency of a static-pressure bearing apparatus cannot be changed to be outside of the scope of the frequency of the micro vibrations. If a static-pressure bearing apparatus resonates from the micro vibrations, the micro vibrations can have an increased amplitude of several 100 nm.

So, the purpose of the present invention is to achieve a highly accurate static-pressure bearing apparatus and a stage comprising it, wherein the apparatus maintains the entire region of a passage for pressurized gas in a laminar-flow status by adopting an orifice and a vent groove such that the apparatus may prevent the occurrence of vibrations.

To achieve that purpose, the invention of the first aspect adopts a technical means that is a static-pressure bearing apparatus. The static-pressure bearing apparatus is configured to have a bearing clearance between a sliding surface of a fixed body and a moving body. The moving body is floated and movable above the fixed body by means of pressurized gas supplied into the bearing clearance. The moving body comprises a main pipe, an orifice, and a static-pressure pad. The main pipe may open at an outlet on the sliding surface and may supply pressurized gas. The orifice may be provided at the outlet of the main pipe and may adjust the flow of the pressurized gas. The static-pressure pad may be formed to have a vent groove. The vent groove may communicate with the orifice. Also, the vent groove may distribute and supply the pressurized gas discharged from the orifice to the bearing clearance. The vent groove consists of a circular groove and a plurality of grooves for distribution. The circular groove may surround the orifice. The circular groove may be formed as a circle. The plurality of distributing grooves extend radially from the orifice to the circular groove. Also, the plurality of grooves for distributing connect the circular groove and the orifice. The vent groove is formed to be symmetrical about a centerline of the direction that the moving body moves. The vent groove in its width direction has a cross-sectional shape that forms a curve that is convex in the direction perpendicular to the sliding surface.

The invention of the first aspect may float, move, and position the moving body above the fixed body by (a) supplying pressurized gas through the main pipe provided on the moving body, (b) adjusting the flow of the pressurized gas by means of the orifice provided at the outlet of the main pipe that opens on the sliding surface, and (c) supplying pressurized gas into the bearing clearance that is provided between the sliding surface of the fixed body and the moving body by means of the static-pressure pad that is formed to provide a vent groove that communicates with the orifice and distributes and supplies the pressurized gas discharged from the orifice to the bearing clearance. A laminar flow may be maintained without causing a pressure loss or turbulence of a flow when pressurized gas flows from the vent groove toward the width direction of vent groove into a bearing clearance, because the cross-sectional shape in the width direction of the vent groove curves toward a direction perpendicular to the sliding surface. Also, the pressure distribution of the pressurized gas in a bearing clearance may be made uniform by forming a vent groove such that the vent groove consists of a circular groove, which is circularly formed and surrounds the orifice, and a plurality of distributing grooves, which extend radially from the orifice to the circular groove and connect the circular groove and the orifice, and such that the vent groove is formed to be symmetrical about the centerline of the direction that the moving body moves. The highly accurate static-pressure bearing apparatus that may prevent the occurrence of vibrations is achieved, because the pressurized gas discharged from the static-pressure pad into the bearing clearance may be a laminar flow having a uniform pressure distribution by means of the above configurations. In addition, a static-pressure bearing apparatus having a high stiffness is achieved, because a laminar flow may be stably maintained such that the pressure for supplying the pressurized gas can be raised.

The invention of the second aspect adopts a technical means that is the static-pressure bearing apparatus of the invention of the first aspect, wherein the distributing grooves in their width directions have a total cross-sectional area that is not less than the cross-sectional area of the orifice.

In the invention of the second aspect, the distributing groove has a total cross-sectional area of not less than the cross-sectional area of the orifice, where the total cross-sectional area is determined in the direction of the width of the groove. For example, where each groove of the distributing grooves has a cross-sectional area of S1, where the number of distributing grooves is n, and where an orifice has a cross-sectional area of S2, there is a relationship of $S1*n \geq S2$ between the cross-sectional area of S1 and the cross-sectional area of S2. Thereby a stable laminar flow may be maintained and the occurrence of vibrations may be prevented, because a pressure loss hardly occurs while the pressurized gas that is being discharged from the orifice flows into a distributing groove.

The invention of the third aspect adopts a technical means that is the static-pressure bearing apparatus of the invention of the first aspect, wherein the vent groove has a surface roughness less than that of the sliding surface of the moving body.

In the invention of the third aspect, the vent groove is configured to have a surface roughness less than that of the sliding surface of the moving body. So, the lesser surface roughness of the vent groove may prevent the occurrence of a turbulent flow due to a surface roughness, although a flow of pressurized gas can be easily changed to be a turbulent flow more easily than can the pressurized gas on a sliding surface. As a result, a stable laminar flow may be maintained. Also, the occurrence of vibrations may be prevented. For example, the vent groove preferably has a surface roughness Ra of 0.1 to 0.4 micron when the sliding surface has a surface roughness Ra (arithmetic mean roughness) of 0.2 to 0.6 micron.

The invention of the fourth aspect adopts a technical means that is the static-pressure bearing apparatus of any of the inventions of the first, the second, and the third aspect, wherein the static-pressure bearing apparatus further comprises an exhaust groove that surrounds the circular groove. The exhaust groove guides and ejects the pressurized gas, which is supplied from the vent groove into the bearing clearance, from the bearing clearance. The exhaust groove is configured to be symmetrical about the centerline of the direction that the moving body moves. The exhaust groove in the direction of its width has a cross-sectional shape that is formed to be a curve that is convex in a direction perpendicular to the sliding surface. The exhaust groove has a cross-sectional area of not less than that of the circular groove.

The pressurized gas may be efficiently exhausted from the bearing clearance by configuring the exhaust groove in the same way as in the invention of the fourth aspect. Then, the distribution of the pressure of the pressurized gas is made uniform. As a result, a laminar flow may be maintained, because the flow rate of the pressurized gas may be stabilized.

The invention of the fifth aspect adopts the following technical means. It is the static-pressure bearing apparatus of any of the inventions of the first, the second, and the third aspect, wherein the bearing clearance is 10 microns or less.

The bearing clearance may be reduced in the static-pressure bearing apparatus of any of the inventions of the first, the second, and the third aspect, because a laminar flow may be stably maintained. The static-pressure bearing apparatus may be configured such that the bearing clearance is 10 microns or less in the same way as in the invention of the fifth aspect. The clearance is less than that of the bearing clearance of a conventional static-pressure bearing apparatus. Thereby, a static-pressure bearing apparatus having a higher stiffness may be achieved.

The invention of the sixth aspect adopts the following technical means. It is the static-pressure bearing apparatus of any of the inventions of the first, the second, and the third aspect, wherein the moving body and the fixed body are made of ceramic.

The surface accuracy of the moving body and the fixed body may be improved by making them of ceramic like the invention of the sixth aspect. So, a static-pressure bearing apparatus having a higher accuracy and a higher stiffness may be achieved. Any change in size due to a change of temperature may be reduced, because the thermal expansion of ceramic is less than that of a metallic material. So, a more highly accurate static-pressure bearing apparatus is achieved.

The invention of the seventh aspect adopts the following technical means. It is a stage comprising the static-pressure bearing apparatus of any of the inventions of the first, the second, and the third aspect, wherein the stage is configured such that a material loaded on the moving body is movable along the fixed body.

In the invention of the seventh aspect, an excellent stage that has a high stiffness and prevents occurrence of vibrations while the stage is in a driving state and a static state is achieved, because the stage comprises the static-pressure bearing apparatus of any of the inventions of the first, the second, and the third aspect.

BRIEF DESCRIPTION OF THE DRAWINGS

FIG. 2 (A) is an enlarged illustration of the cross-section 2A-2A of FIG. 1. FIG. 2 (B) is an enlarged illustration of an orifice.

FIG. 4 is a cross-sectional illustration illustrating the cross-sectional shape in the direction of the width of a vent groove with the width of an exhaust groove.

FIG. 9 (A) is a perspective illustration. FIG. 9 (B) is a perspective illustration of the cross-section X-X of FIG. 9 (A).

DETAILED DESCRIPTION OF THE INVENTION

Hereafter, the static-pressure bearing apparatus of the present invention will be explained in reference to the figures. Incidentally, the present invention is not limited to the following embodiments.

Figure 1:
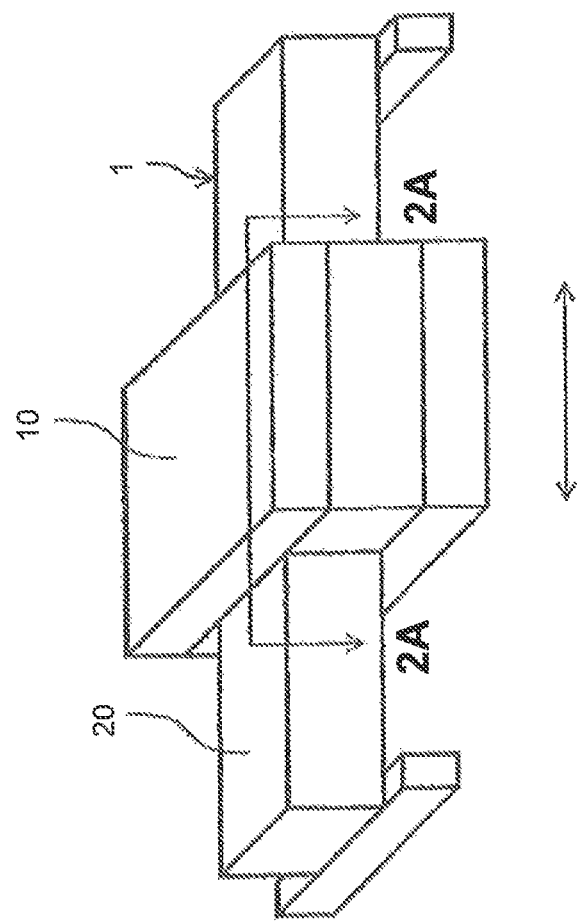
FIG. 1 is a perspective illustration of a static-pressure bearing apparatus.

As shown in FIG. 1, the static-pressure bearing apparatus 1 consists of the fixed body 20 and the moving body 10. The fixed body 20 is formed as a rectangle. The moving body 10 is formed to surround the fixed body 20. Also, the moving body 10 is configured to be movable along the fixed body 20. The moving body 10 and the fixed body 20 are made of ceramic such as alumina. The surface accuracy of the static-pressure bearing apparatus may be improved by forming the moving body 10 and the fixed body 20 from ceramic. As a result, any possible occurrence of a turbulent flow may be prevented. Thus, a static-pressure bearing apparatus having a high accuracy may be achieved. Also, a size change due to a change of temperature may be reduced, because the thermal expansion of ceramic is less than that of a metallic material. So, a static-pressure bearing apparatus having a high accuracy is achieved.

Figure 2:
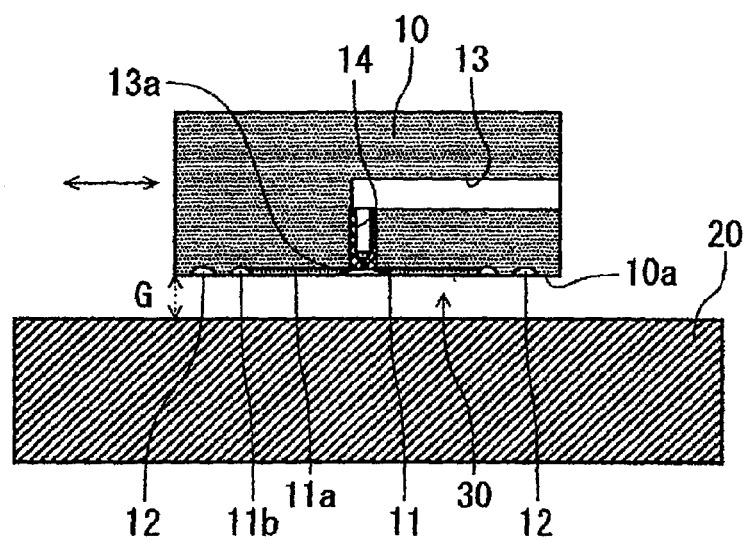
FIG. 2 is a cross-sectional illustration of a static-pressure bearing apparatus.
Figure 2:
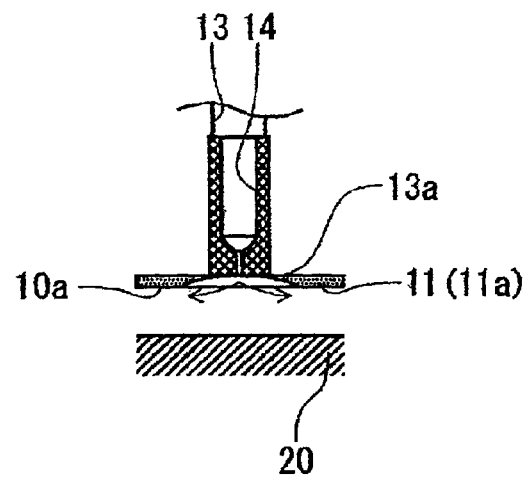

As shown in FIG. 2 (A), the moving body 10 comprises the main pipe 13, the orifice 14, and the static-pressure pad 30. The main pipe 13 supplies pressurized gas. The orifice 14 adjusts the flow of the pressurized gas. The static-pressure pad 30 communicates with the orifice 14. Also, the static-pressure pad 30 distributes and supplies the pressurized gas discharged from the orifice 14 into the bearing clearance G. The bearing clearance G occurs between the sliding surface 10a of the moving body 10 and the fixed body 20.

The static-pressure pad 30 has the vent groove 11. The vent groove 11 consists of the distributing grooves 11a and the circular groove 11b, both described below. The exhaust groove 12 is formed outside the vent groove 11. The exhaust groove 12 guides and exhausts the pressurized gas, which is supplied from the vent groove 11 into the bearing clearance G, and then out of the bearing clearance G. FIG. 2 (A) shows the structure of the moving body 10 above the fixed body 20. The upper surface of the moving body below the fixed body 20 has the same structure. Incidentally, the sliding surfaces may have the same structure in a horizontal direction.

As shown in FIG. 2 (B), the orifice 14 is provided on the outlet 13a of the main pipe 13, which opens on the sliding surface 10a (the main pipe 13 opens on the lower surface in this figure). The orifice 14 on the side of the outlet 13a is formed to be tapered, which is a convergent shape, to reduce pressure loss. Thereby, the pressurized gas discharged from the outlet 13a is adjusted to be a laminar flow. In this embodiment, the main pipe 13 is provided as a tube having a diameter of about 3 to 5 mm. The apex of the orifice 14 is formed to have a diameter of 0.2 to 0.3 mm.

The static-pressure bearing apparatus 1 may float and move the moving body 10 above the fixed body 20 along the direction that the fixed body 20 is extended by supplying pressurized gas from the main pipe 13 through the orifice 14 to the static-pressure pad 30 and by discharging the pressurized gas from the static-pressure pad 30 into the bearing clearance G, which occurs between the sliding surface 10a of the moving body 10 and the fixed body 20. Thus, the static-pressure bearing apparatus 1 may achieve a highly accurate positioning of the moving body 10. The pressurized gas discharged from the static-pressure pad 30 into the bearing clearance G is exhausted from the bearing clearance G through the exhaust groove 12.

To achieve a highly accurate movement and positioning of the moving body, the orifice 14, the vent groove 11, the exhaust groove 12, etc., of the static-pressure bearing apparatus 1 of the present invention, are all configured such that a laminar flow may be maintained in the entire area of the route of the ventilated pressurized gas. Specific configurations will be given below.

Figure 3:
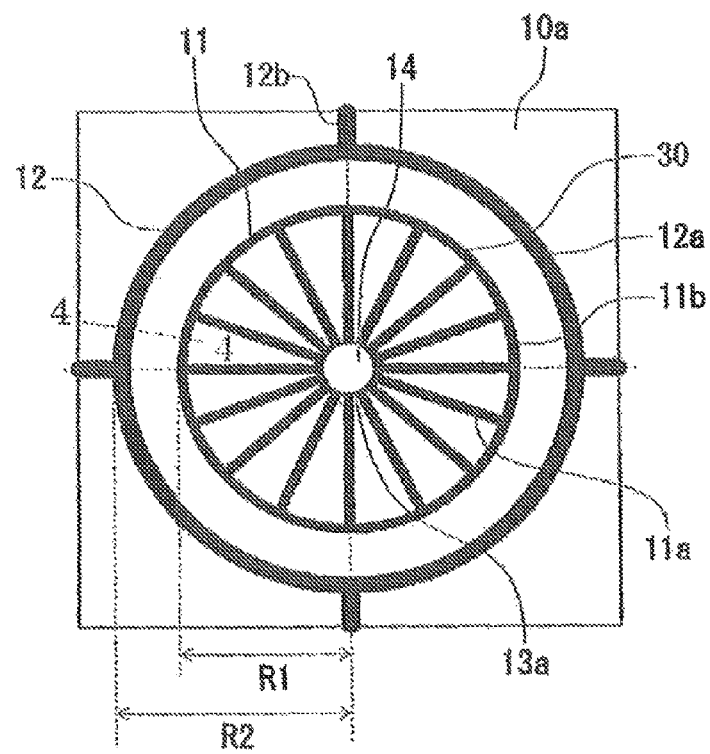
FIG. 3 is a plan view illustrating the structure of a static-pressure pad in a static-pressure bearing apparatus.

As shown in FIG. 3, the sliding surface 10a is formed as a rectangle. The static-pressure pad 30 and the exhaust groove 12 are provided on the sliding surface 10a. The static-pressure pad 30 comprises the vent groove 11. The static-pressure pad 30 is configured to have a combined restrictor that is a combination of an orifice restrictor and a surface restrictor.

The vent groove 11 comprises the circular groove 11b and a plurality of distributing grooves 11a. The circular groove 11b is formed as a circle. Also, the circular groove 11b surrounds the orifice 14. The plurality of distributing grooves 11a radially extend from the orifice 14, which is the center, to the circular groove 11b. The plurality of distributing grooves 11a connect the circular groove 11b to the orifice 14. In this embodiment, the circular groove 11b is formed as a circle. The distributing grooves 11a consist of a total of sixteen grooves provided at angles of 22.5 degrees. Also, the vent groove 11 is formed to be symmetrical about the centerline of the direction of the movement (a horizontal direction in the figure) of the moving body 10.

Figure 4:
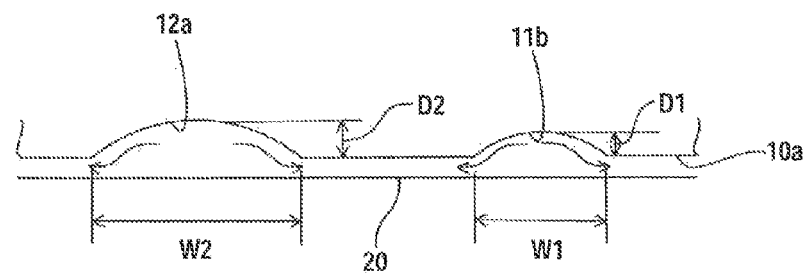
FIG. 4 illustrates the cross-section 4-4 of FIG. 3.

The exhaust groove 12 comprises a circular exhaust groove 12a and external exhaust grooves 12b. The circular exhaust groove 12a is provided to surround the circular groove 11b. The external exhaust grooves 12b connect the circular exhaust groove 12a to the outside of the static-pressure bearing apparatus 1. The exhaust groove 12 is formed in a shape that may efficiently exhaust the pressurized gas to the outside such that the pressure distribution of the pressurized gas may be uniform (FIG. 4). Also, the exhaust groove 12 is formed to be symmetrical about the centerline of the direction that the moving body 10 moves, like the vent groove 11.

To exhaust the pressurized gas at a rate corresponding to the pressurized gas provided from the circular groove 11b such that the pressure distribution will be uniform, the circular exhaust groove 12a preferably has a shape like that of the circular groove 11b. In this embodiment, the circular exhaust groove 12a has a circular shape like that of the circular groove 11b. When the radius R2 of the circular exhaust groove 12a has a length that is at least twice the width W1 (FIG. 4) of the circular groove 11b plus the distance of the radius R1 of the circular groove 11b, an excellent exhaust state, namely, where neither pressure loss nor turbulence of the pressurized gas occurs, is achieved. In the example given below, the gas was appropriately exhausted, and vibrations did not occur, when the apparatus had a relationship of R2-R1=2-10 mm.

The pressurized gas that is discharged from the outlet 13a through the orifice 14 and through the main pipe 13 is isotropically distributed by the distributing grooves 11a in the static-pressure pad 30. The distributed gas is discharged from the distributing grooves 11a and from the circular groove 11b into the bearing clearance G. Then, the discharged gas is discharged from the bearing clearance G through the exhaust groove 12. As given above, the pressure distribution of the pressurized gas in the bearing clearance G may be made uniform by having the vent groove 11 be such that it is symmetrical about the centerline of the direction that the moving body 10 moves. Further, the pressurized gas may be efficiently exhausted to the outside such that the pressure distribution of the pressurized gas may be uniform, if the exhaust groove 12 is provided. As a result, the flow rate of the pressurized gas may be stabilized.

As shown in FIG. 4, the vent groove 11 (only the circular groove 11b is shown in the figure) and the exhaust groove 12 (only the circular exhaust groove 12a is shown in the figure) are configured such that their cross-sectional shapes in the width directions form a curve that is convex in the direction perpendicular to the sliding surface 10a. In this embodiment, the cross-sectional shape of the circular groove 11b is formed to be an arc-like shape. The depth of D1 is 10 microns or less. The width W1 is 300 to 500 microns. The distributing groove 11a also has the same sectional shape as that of the circular groove 11b. For example, the vent groove 11 may be formed by processing it with a grinding twist drill having a radius of 1 to 5 mm. Neither pressure loss nor turbulence of airflow occurs when the pressurized gas flows toward the direction of the width of each groove into the bearing clearance G, because the cross-sectional shapes of the width directions of the vent groove 11 and the exhaust groove 12 form a curve that is convex in the direction perpendicular to the sliding surface 10a. As a result, a laminar flow can be maintained.

The sum of the cross-sectional areas of the width direction of the distributing groove 11a is not less than the cross-sectional area of the orifice 14. For example, when one of the distributing grooves 11a has a cross-sectional area of S1 and the orifice 14 has a cross-sectional area of S2, there is a relation of S1×16≥S2, since in this embodiment the distributing grooves 11a consist of sixteen grooves. Thereby, a stable laminar flow may be maintained, because pressure loss hardly occurs when the pressurized gas that is discharged from the orifice 14 flows into the distributing grooves 11a as a laminar flow. As a result, vibrations may be prevented.

To exhaust the pressurized gas at a rate corresponding to the amount of the pressurized gas discharged from the circular groove 11b, the circular exhaust groove 12a preferably has a cross-sectional area of not less than that of the circular groove 11b. In this embodiment, the cross-sectional shape of the circular groove 11b is formed to be an arc-like shape, like the vent groove 11. Also, the cross-sectional shape of the circular groove 11b has a depth D2 of 30 microns and a width W2 of 300 microns.

Further, any possible turbulence of the gas flow is further prevented if the corners in the boundary between the sliding surface 10a and the vent groove 11 or the exhaust groove 12 are chamfered to be smooth. As a result, a laminar flow may be more stable.

The vent groove 11 may be provided such that its surface roughness is less than that of the sliding surface 10a of the moving body 10. Thereby, any turbulence of the gas flow due to a surface roughness may be reduced in the vent groove 11, where the flow of the pressurized gas can be more easily changed to be turbulent than the pressurized gas on the sliding surface 10a. As a result, a stable laminar flow may be maintained. Also, vibrations may be prevented. For example, the vent groove 11 preferably has a surface roughness Ra of 0.1 to 0.4 micron, if the sliding surface 10a has a surface roughness Ra (an arithmetic mean roughness) of 0.2 to 0.6 micron.

The static-pressure bearing apparatus 1 of the present invention may maintain a stable laminar flow. In addition, the static-pressure bearing apparatus 1 may achieve a high stiffness even when the pressure of the supplied pressurized gas is lowered. The static-pressure bearing apparatus may achieve a higher stiffness by reducing the bearing clearance G to be 10 microns or less, which is less than that of a conventional static-pressure bearing apparatus.

The static-pressure bearing apparatus 1 of the present invention may convert the pressurized gas discharged from the static-pressure pad 30 into the bearing clearance G into a laminar flow having a uniform pressure distribution, because the apparatus has the above configurations. As a result, the static-pressure bearing apparatus 1 has high accuracy because the apparatus may prevent vibrations. For example, the static-pressure apparatus may perform an extremely accurate positioning within a distance of 10 nm or less. Further, the static-pressure bearing apparatus 1 may achieve a high stiffness, because a stable laminar flow may be maintained such that a rise in the pressure of the supplied pressurized gas is allowed.

A stage comprising the static-pressure bearing apparatus 1, wherein an object may be loaded on the moving body 10 and wherein the moving body 10 is movable along the fixed body 20 by means of the apparatus, may be an excellent stage, i.e., one that has a high stiffness and successfully reduces vibrations while driving and while resting. Thus, the stage comprising the static-pressure bearing apparatus 1 may be preferably used for applications that require a high accuracy for moving an object, such as a scanning-type exposure device and an inspection apparatus for a liquid crystal panel. A multiaxial moving mechanism, such as an X-Y stage, may also be achieved by combining a plurality of the static-pressure bearing apparatuses of the present invention.

The cross-sectional shapes of the vent groove 11 and the exhaust groove 12 may have the shape of an arch in an ellipse or other curved shapes as long as such a smooth shape may successfully maintain a laminar flow.

The vent groove 11 and the exhaust groove 12 may have any shape as long as the grooves are symmetrical about the centerline of the direction that the moving body moves. The vent groove 11 and the exhaust groove 12 may be asymmetrical along the direction orthogonal to the direction that the moving body moves.

The number of the distributing grooves 11a and the external exhaust grooves 12b may be any value as long as the number is within a range where a laminar flow is maintained. The cross-sectional shapes of the distributing grooves 11a and the cross-sectional shape of the circular groove 11b may differ, as long as a laminar flow is maintained. Also, the cross-sectional shape of the circular exhaust groove 12a and the cross-sectional shapes of the external exhaust grooves 12b may differ, as long as a laminar flow is maintained.

The exhaust groove 12 may be omitted as long as the pressurized gas is stably exhausted to the outside.

The ceramic that constitutes the fixed body 20 and the moving body 10 is not limited to alumina. The ceramic may be of various kinds, such as zirconium oxide, silicon carbide, and silicon nitride. The fixed body 20 and the moving body 10 may be made of a material that is not ceramic. For example, a metallic material such as stainless steel may be used as the material.

A Test for Evaluation

The performance of the static-pressure bearing apparatus 1 of the present invention was compared with the conventional static-pressure bearing apparatus 100.

A square pole made of an alumina ceramic with a purity of 99.8% that has a cross-section 42 mm×42 mm and a length of 200 mm, was used as the fixed body 20 in the static-pressure bearing apparatus 1 of the present invention. The moving body 10 consisted of a combination of four plates made of the same alumina ceramic such that the moving body 10 surrounded the fixed body 20. The upper plate and the lower plate both have a width of 80 mm, a thickness of 20 mm, and a length of 80 mm. Also, the left plate and the right plate have a width of 40 mm, a thickness of 20 mm, and a length of 80 mm. The bearing mechanisms of the static-pressure pad 30 and the exhaust groove 12, etc., were formed on the sliding surfaces 10a of the upper and lower plates. The apex of the orifice 14 is formed to have a diameter of 0.3 mm. The vent groove 11 is formed to have an arc-like cross-section having a depth of 10 micrometers and a width of 300 microns. The bearing gap G is two microns thick. The sliding surfaces 10a were formed to have a surface roughness Ra of 0.4 micron. Also, the vent groove 11 was formed to have a surface roughness Ra of not more than 0.2 micron.

Figure 5:
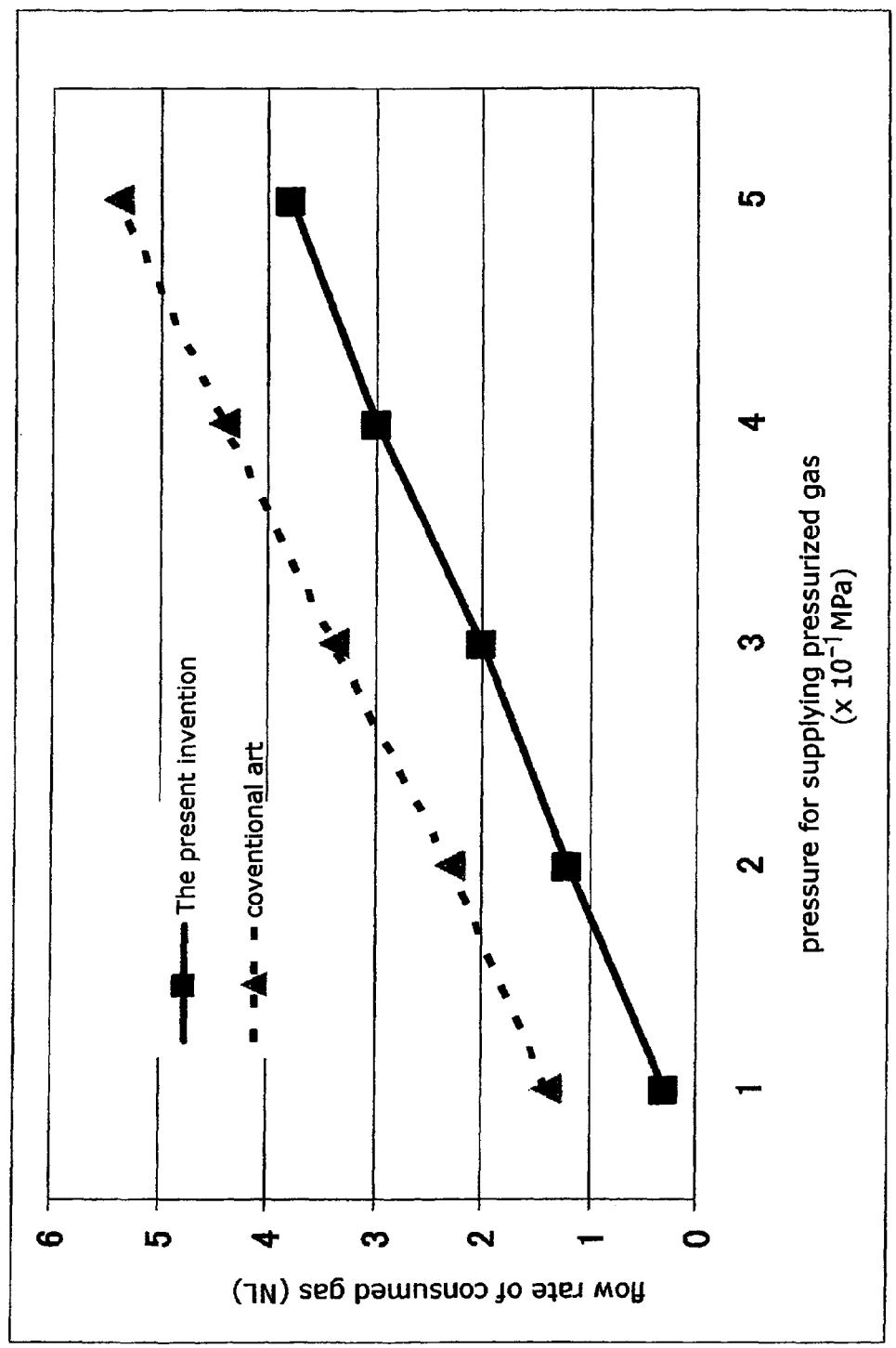
FIG. 5 illustrates the relationship between the pressure of the pressurized gas and a consumption flow rate.

First, the flow rate of the consumed pressurized gas was evaluated. The evaluation of the flow rate of the consumed gas was performed by measuring the amount of the air discharged from the exhaust groove 12 and the bearing clearance G while changing the pressure of the compressed air supplied from the main pipe 13. FIG. 5 shows the flow rate of the consumed air while changing the pressure to within a range from 0.1 to 0.5 MPa. The flow rate of the consumed compressed air in the static-pressure bearing apparatus 1 of the present invention has been reduced to two-thirds of that in the conventional static-pressure bearing apparatus. Thus, the flow rate of the consumed compressed air has been found to be successfully reduced.

Next, the stiffness was evaluated. The stiffness was obtained by measuring the amount of displacement of the moving body 10 with an electric micrometer when a predetermined load was applied to the moving body 10 and by performing a calculation using the following formula.

Stiffness (N/micron)=Load (kg)×9.8/Displacement (micron)

Figure 6:
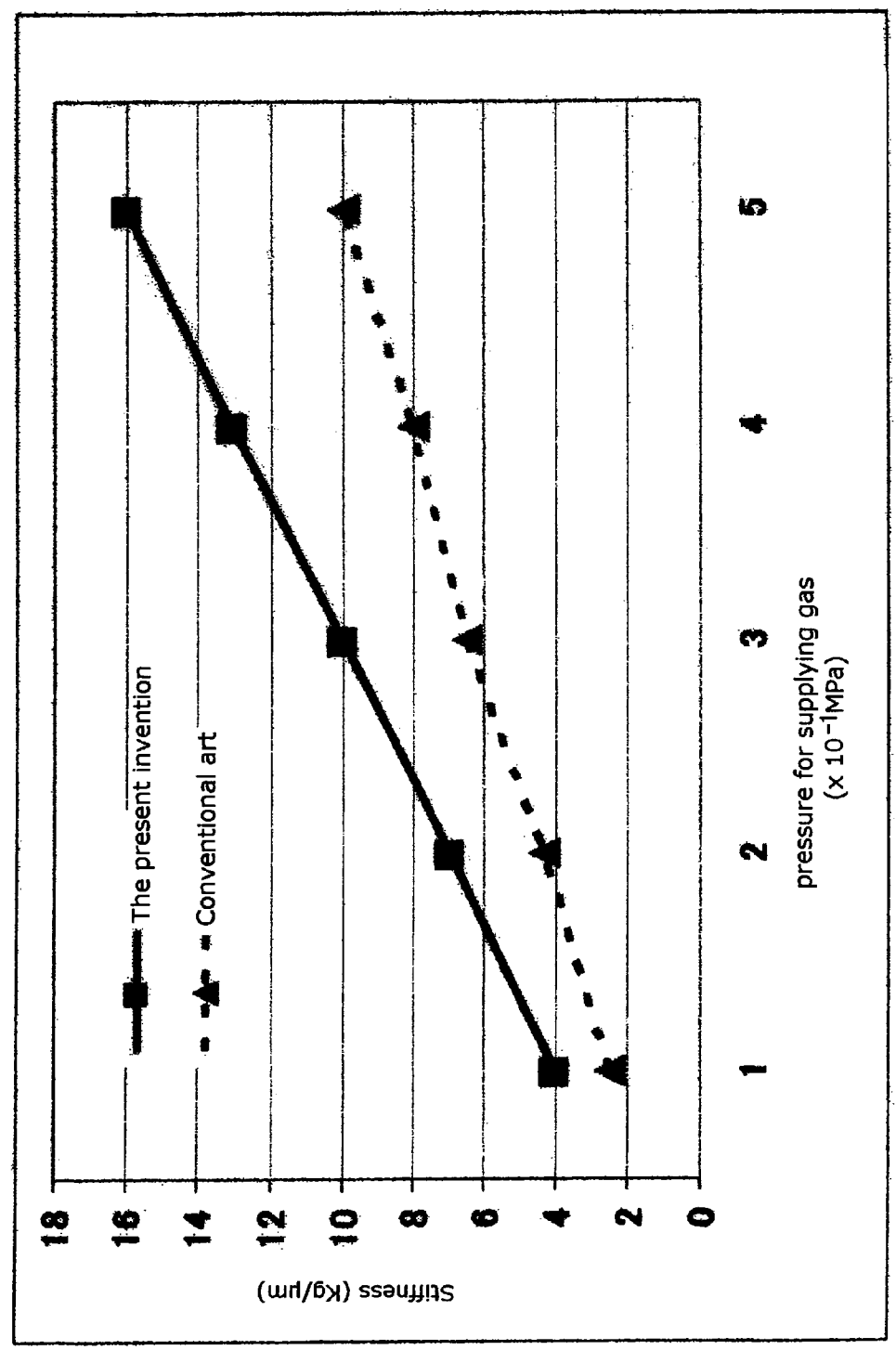
FIG. 6 illustrates the relationship between the pressure of the pressurized gas and a stiffness.

FIG. 6 shows the resultant stiffness while changing the supplied pressure to be within a range from 0.1 to 0.5 MPa. The stiffness in the static-pressure bearing apparatus 1 of the present invention was greater by about 1.6 times than that in the conventional static-pressure bearing apparatus. Together with FIG. 5, it is seen that the static-pressure bearing apparatus of the present invention has been found to have a low flow rate of the consumed compressed air and a high stiffness.

Figure 7:
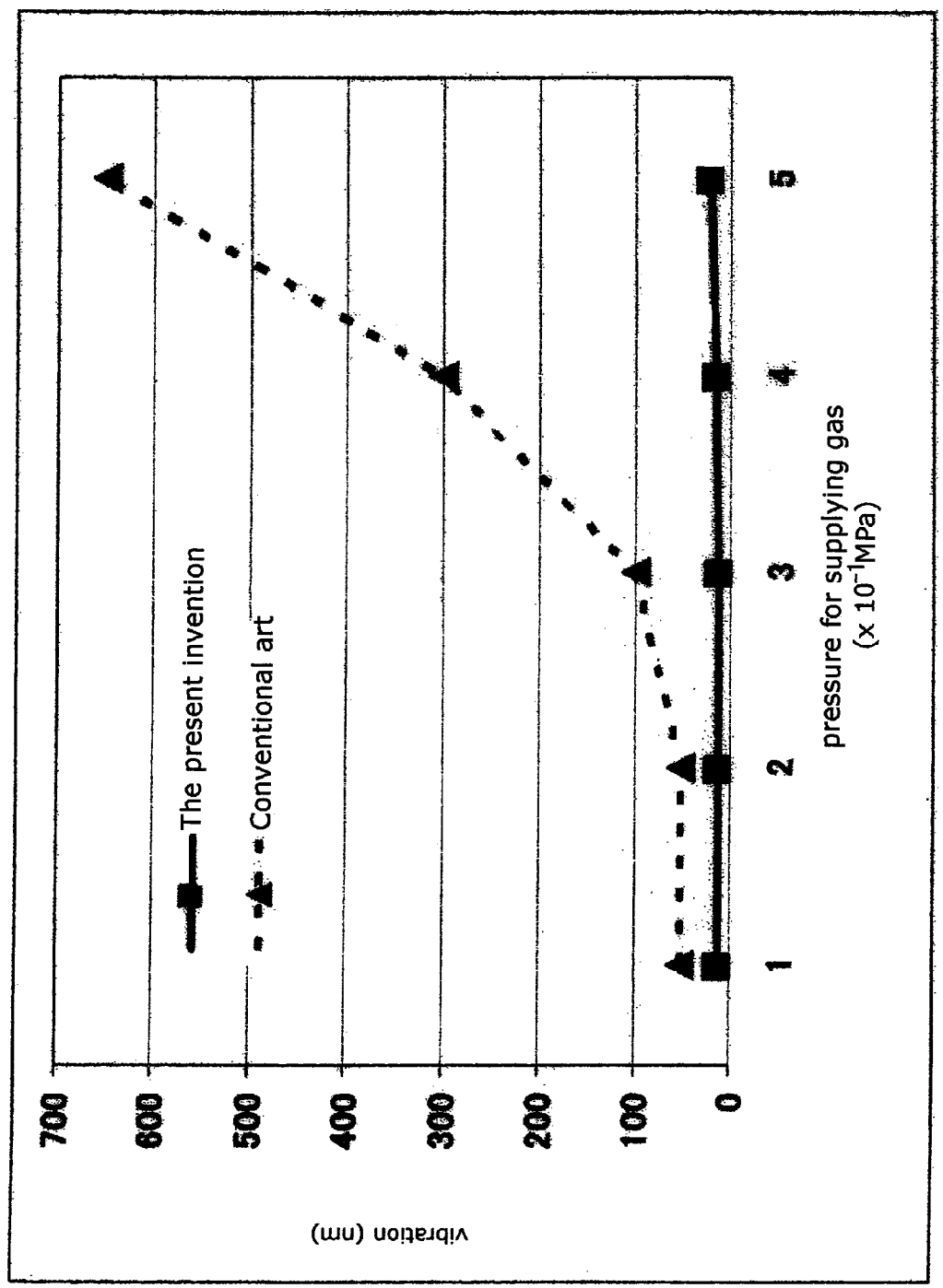
FIG. 7 illustrates the relationship between the pressure of the pressurized gas and the amplitude of a moving body.

Next, vibrations were measured in the static-pressure bearing apparatus 1 of the present invention and the conventional static-pressure bearing apparatus. FIG. 7 shows the resultant amplitude of vibrations while changing the supplied pressure to be within a range from 0.1 to 0.5 MPa. Both apparatuses hardly caused vibrations at a supplied pressure of not more than 0.2 MPa. However, the conventional static-pressure bearing apparatus caused a higher amplitude of vibrations when a supplied pressure of more than 0.3 MPa was used. Further, the apparatus caused severe vibrations at 0.5 MPa such that the apparatus could not be used. In contrast, the static-pressure bearing apparatus 1 of the present invention hardly caused vibrations even when a supplied pressure of 0.5 MPa was used. As just described, the static-pressure bearing apparatus 1 of the present invention, which has an optimized setting, may stably operate with an amplitude of vibrations of 10 nm or less.

The Effects of the Present Invention (1)

To move and position a moving body very accurately, the shapes of the orifice 14, the vent groove 11, the exhaust groove 12, etc., of the static-pressure bearing apparatus 1 of the present invention, have been designed such that a laminar flow may be maintained in the entire region of the routes for ventilation of the pressurized gas. Also, a laminar flow may be maintained without any pressure loss or turbulent airflow when the pressurized gas flows out and toward the direction of the width of the vent groove 11 into the bearing clearance. This is because the vent groove in the direction of its width has a cross-sectional shape that forms a curve that is convex in a direction perpendicular to the sliding surface 10a. Further, the distribution of the pressure of the pressurized gas in the bearing clearance G may be uniform. This is because the vent groove that comprises the circular groove 11b, which is formed circularly to surround the orifice 14, and the plurality of distributing grooves 11a, which extend radially from the orifice 14 to the circular groove 11b such that the plurality of distributing grooves 11a connect the circular groove 11b to the orifice 14, is formed to be symmetrical about the centerline of the direction that the moving body 10 moves. A laminar flow may be stably maintained because the exhaust groove 12 may stabilize the flow rate of the pressurized gas by discharging the gas efficiently from the bearing clearance G such that the distribution of the pressure of the gas may be uniform. The static-pressure bearing apparatus may be highly accurate such that the apparatus may prevent vibrations. This is because the pressurized gas discharged from the static-pressure pad 30 into the bearing clearance G may be converted into a laminar flow having a uniform distribution of pressure by the above-described configurations. Further, the static-pressure bearing apparatus 1 may have a high stiffness because a laminar flow may be stably maintained such that it enables the pressure of the supplied pressurized gas to be increased.

The Effects of the Present Invention (2)

An excellent stage that has a high stiffness and prevents vibrations from occurring while being driven or being stationary may be achieved by configuring the stage such that an object loaded on the moving body 10 may be movable along the fixed body 20 by means of the static-pressure bearing apparatus 1.

Figure 8:
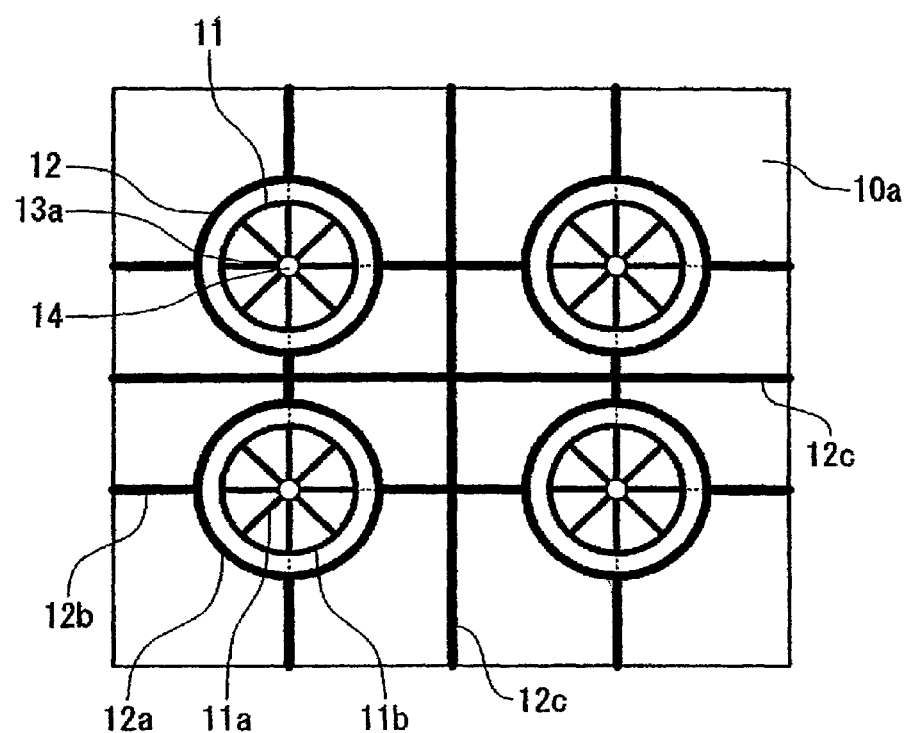
FIG. 8 is a plan view illustrating a modified example of the structure of a static-pressure pad in a static-pressure bearing apparatus.
Figure 9:
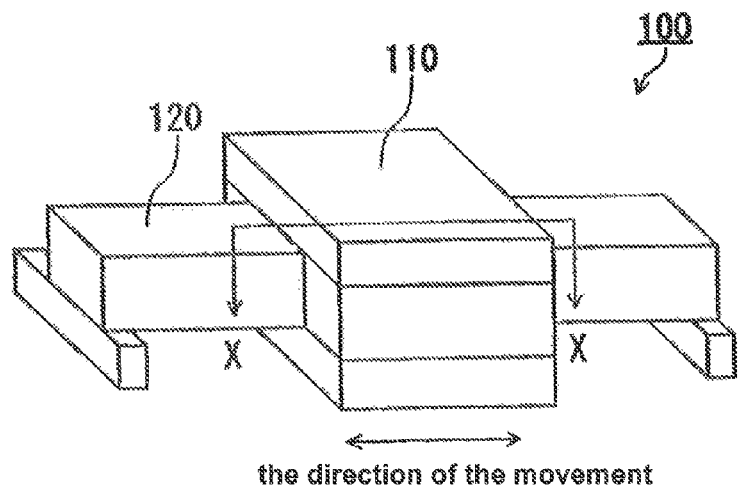
FIG. 9 illustrates the structure of a conventional static-pressure bearing apparatus.
Figure 9:
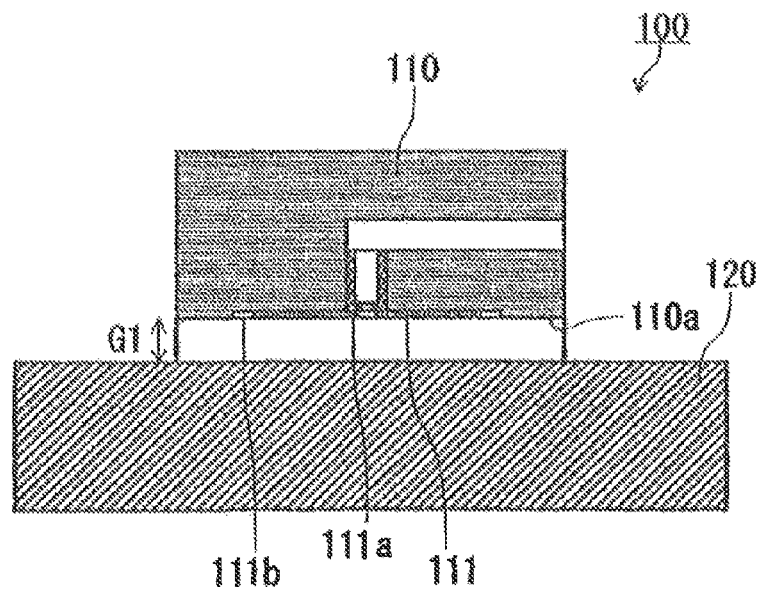

Just one static-pressure pad 30 was used in the above-described embodiment. However, the apparatus is not limited to the embodiment. A configuration comprising a plurality of static-pressure pads 30 on one of the sliding surfaces 10*a* may be used. For example, as shown in FIG. 8, the four static-pressure pads 30 may be disposed bilaterally and symmetrically. The exhaust groove 12 must be formed in the configuration comprising a plurality of static-pressure pads 30 because the flow of the pressurized gas may be easily disrupted when the gas is discharged. In addition to the circular exhaust grooves 12*a* and the external exhaust grooves 12*b*, second external exhaust grooves 12*c* are formed in the present embodiment. The second external exhaust grooves 12*c* communicate with the external exhaust grooves 12*b* to assist in discharging the gas. The second external exhaust grooves 12*c* are formed as a cross such that the region where the static-pressure pads 30 are formed is partitioned. The configuration enables the pressurized gas to be discharged smoothly such that the flow rate of the pressurized gas may be stabilized. As a result, a stable laminar flow may be maintained.

The invention claimed is:

1. A static-pressure bearing apparatus comprising a bearing clearance between a fixed body and a sliding surface of a moving body,
   the moving body is floated and movable above the fixed body by supplying pressurized gas into the bearing clearance,
   wherein the moving body comprises a main pipe, an orifice, and a static-pressure pad,
   the orifice is provided at the outlet of the main pipe and adjusts the flow of the pressurized gas,
   the main pipe opens at an outlet on the sliding surface and supplies pressurized gas,
   the static-pressure pad is formed to have a vent groove that communicates with the orifice and the static-pressure pad distributes and supplies the pressurized gas that is discharged from the orifice to the bearing clearance,
   wherein the vent groove consists of a circular groove and plural distributing grooves,
   the circular groove is formed as a circle to surround the orifice,
   the plural distributing grooves extend radially from the orifice toward the circular groove and the plural distributing grooves connect the circular groove and the orifice,
   wherein the vent groove is configured to be symmetrical about a center line of a direction of a movement of the moving body,
   wherein the vent groove in a direction of a width of the vent groove has a cross-sectional shape formed to be a curve that is convex in a direction perpendicular to the sliding surface,
   the static-pressure bearing apparatus further comprising an exhaust groove that surrounds the circular groove,
   wherein the exhaust groove guides and discharges the pressurized gas from the bearing clearance,
   wherein the pressurized gas is supplied from the vent groove into the bearing clearance,
   wherein the exhaust groove is formed to be symmetrical about a centerline of a direction that the moving body moves,
   wherein the exhaust groove in a width direction of the exhaust groove has a cross-sectional shape that is formed to be a curve that is convex in a direction perpendicular to the sliding surface,
   and wherein the exhaust groove has a cross-sectional area of not less than a cross-sectional area of the circular groove.

2. The static-pressure bearing apparatus of claim 1, wherein the distributing grooves in a direction of a width of the distributing grooves have a total cross-sectional area of not less than a cross-sectional area of the orifice.

3. The static-pressure bearing apparatus of claim 1, wherein the vent groove has a surface roughness of less than a surface roughness of the sliding surface of the moving body.

4. The static-pressure bearing apparatus of any one of claims 1, 2, and 3, wherein the bearing clearance has a thickness of 10 microns or less.

5. The static-pressure bearing apparatus of any one of claims 1, 2, and 3, wherein the moving body and the fixed body are made of ceramic.

6. A stage comprising the static-pressure bearing apparatus of any one of claims 1, 2, and 3, wherein the stage is configured such that an object loaded on the moving body is movable along the fixed body.

* * * * *